(12) United States Patent
Pantaleoni

(10) Patent No.: US 8,538,204 B1
(45) Date of Patent: Sep. 17, 2013

(54) SYSTEMS AND METHODS FOR ESTIMATING PIXEL INTENSITY

(75) Inventor: Jacopo Pantaleoni, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 169 days.

(21) Appl. No.: 13/227,298

(22) Filed: Sep. 7, 2011

(51) Int. Cl.
*G06K 9/32* (2006.01)
*G06T 15/00* (2011.01)
*G06T 15/50* (2011.01)

(52) U.S. Cl.
USPC .......................... 382/300; 345/419; 345/426

(58) Field of Classification Search
USPC ................. 382/298–300; 345/426, 419, 420, 345/421, 422, 423, 424, 425, 427
See application file for complete search history.

(56) References Cited

U.S. PATENT DOCUMENTS

| 8,102,394 | B2 * | 1/2012 | Pantaleoni | 345/426 |
| 8,188,996 | B2 * | 5/2012 | Dammertz et al. | 345/419 |
| 8,188,997 | B2 * | 5/2012 | Dammertz et al. | 345/419 |
| 8,279,220 | B1 * | 10/2012 | Pantaleoni | 345/426 |
| 2008/0150938 | A1 * | 6/2008 | Pantaleoni | 345/419 |

OTHER PUBLICATIONS

Lafortune E., Willems Y., "Bi-directional Path Tracing", Proc. CompuGraphics 1993.*
Veach, E., "Robust Monte Carlo Methods for Light Transport Simulation," Dissertation, Dec. 1997, pp. 1-406.
Kelemen, C. et al., "A Simple and Robust Mutation Strategy for the Metropolis Light Transport Algorithm," EUROGRAPHICS 2002, vol. 21, No. 3, pp. 1-11.
Cline, D. et al., "Energy Redistribution Path Tracing," Proceedings of SIGGRAPH '05, 2005, pp. 1-10.
Strens, M. J. A., "Markov Chain Monte Carlo Sampling using Direct Search Optimization," Proceedings of the Nineteenth International Conference on Machine Learning, 2002, pp. 1-8.
Braak, C. J. F. Ter, A Markov Chain Monte Carlo version of the genetic algorithm Differential Evolution: easy Bayesian computing for real parameter spaces, Statistics and Computing, 2006, vol. 16, pp. 239-249.

* cited by examiner

*Primary Examiner* — Andrae S Allison
(74) *Attorney, Agent, or Firm* — Zilka-Kotab, PC

(57) ABSTRACT

A method for estimating pixel intensity includes generating a plurality of bidirectional paths extending between a light source and a measurement point, whereby the measurement point represents a pixel within the image. Each bidirectional path includes a light subpath portion extending from the light source and an eye subpath portion extending from the view point and coupled to the light subpath. Each light subpath is characterized by a number of vertices included therein, and similarly, each eye subpath is characterized by a number of vertices included therein. The plurality of bidirectional paths are sorted into separation populations, whereby each population includes bidirectional paths constructed from eye subpaths having a common number of vertices, and light subpaths having a common number of vertices. An intensity contribution is computed for each of the individual populations, and the intensity contributions are summed over all populations to estimate the intensity of the pixel.

20 Claims, 4 Drawing Sheets

SYSTEMS AND METHODS FOR ESTIMATING PIXEL INTENSITY

FIELD OF THE INVENTION

The present invention relates to systems and methods for graphics rendering, and in particular, systems and methods for estimating pixel intensity.

BACKGROUND

Graphics rendering operations are computationally demanding tasks, and designers are often exploring different techniques for simplifying these operations in a manner which reduces the amount of computation required by still produces rich, high quality graphics and images. Light transport simulations are one approach used in visual computing and computer graphics applications such as ray tracing to render the intensity or color value of each pixel of an image. Conventional algorithms treat light transport as an integration problem in the space of all possible paths, and try to solve it using Markov Chain Monte Carlo (MCMC) methods which sample directly from the equilibrium light transport distribution. Examples of these conventional algorithms include Metropolis Light Transport (MLT) and Energy Redistribution Path Tracing (ERPT). However, due to the highly multi-modal nature of the light transport equilibrium distribution, these algorithms suffer from poor mixing in many difficult situations in which the Markov Chains tend to get stuck in local maxima. Consequently, the light transport simulation performed per pixel is relatively slow to converge, and as a result, the complete image, which may include millions of pixels, is consequently slow to render.

Accordingly, an improved system and method for estimating pixel intensity is needed.

SUMMARY

An improved system and method for estimating the pixel intensity is now presented which seeks to address the aforementioned deficiencies. The method includes generating a plurality of bidirectional paths extending between a light source and a measurement point, whereby the measurement point represents a pixel within the image. Each bidirectional path includes a light subpath portion extending from the light source and an eye subpath portion extending from the view point and coupled to the light subpath. Each light subpath is characterized by a number of vertices included within said light subpath, and similarly, each eye subpath is characterized by a number of vertices included within said eye subpath. The method further includes sorting the plurality of bidirectional paths into separation populations, whereby each population includes bidirectional paths constructed from eye subpaths having a common number of vertices, and light subpaths having a common number of vertices. An intensity contribution is computed for each of the individual populations, and the intensity contributions are summed over all populations to estimate the intensity of the pixel.

The method can be performed using, for example, a processor to carry out the aforementioned operations. The method may also be carried out by means of a computer readable medium, which is operable to store instructions for carrying out the aforementioned operations.

These any other features of the invention will be better understood in view of the following figures and corresponding description of exemplary embodiments.

Figure 1:
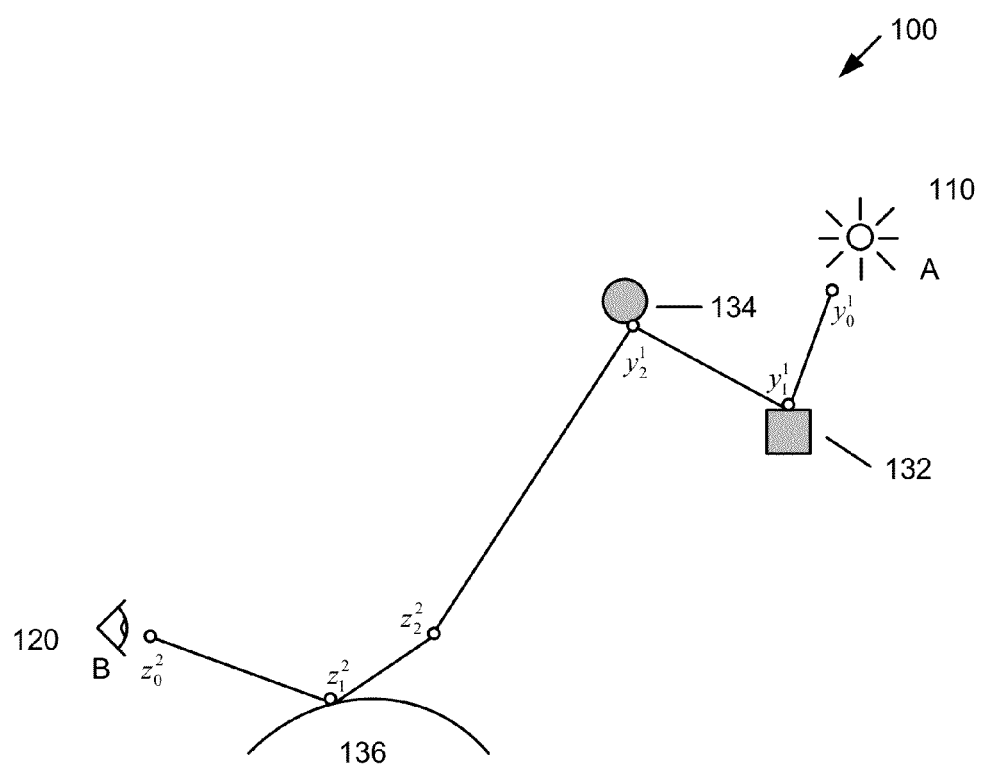
FIG. 1 illustrates an exemplary construct in which eye and light subpaths operate to form bidirectional paths in accordance with the present invention.

For clarity, previously described features retain their reference indicia in subsequent drawings.

DETAILED DESCRIPTION OF EXEMPLARY EMBODIMENTS

Light transport simulation can be expressed as the problem of computing a set of measurements, usually corresponding to the pixels of an image as seen by a virtual eye or camera:

$$I_j = \sum_{k=1}^{\infty} \int_{M^{k+1}} f_j(x_0 \ldots x_k) dA(x_0) \ldots dA(x_k) \quad (1)$$

where:

$I_j$ is the intensity/color value of the $j^{th}$ pixel within an image/scene;

M is the set of 3-dimensional surfaces comprising the scene;

dA is the standard surface area measure;

integrands $f_j$ are the measurement contribution functions defined by:

$$f_j(x_0 \ldots x_k) = f(x_0 \ldots x_k) W_e^{(j)}(x_{k-1} \leftrightarrow x_k) \quad (2)$$

$$f_j(x_0 \ldots x_k) = \quad (3)$$
$$L_e(x_0 \to x_1) G(x_0 \leftrightarrow x_1) \prod_{i=1}^{k-1} f_s(x_{i-1} \to x_i \to x_{i+1}) G(x_i \leftrightarrow x_{i+1})$$

where:

$W_e^{(j)}(x \to y)$ is the importance emission function corresponding to the $j^{th}$ measurement as described in the aforementioned 1997 Veach reference;

$L_e(x \to y)$ is the emitted radiance from x to y;

$G(x \leftrightarrow y)$ is the geometric form factor between the differential surface elements x and y; and $f_s(x \to y \to z)$ represents the bidirectional scattering distribution function (BDSF) at y.

Using the path integral notation introduced in the aforementioned 1997 Veach reference, equation (1) can also be rewritten as a simple integral in the space of all possible paths:

$$I_j = \int_\Omega f_j(\overline{x}) d\mu(\overline{x}) \quad (4)$$

where:

$\Omega$ is the path space formed by all paths of all finite lengths $\Omega = \cup_{k=1}^{\infty} \Omega_k$; $d\mu(\overline{x}) = dA(x_0) \ldots dA(x_k)$ if $\overline{x} \in \Omega_k$ is a path with vertices $x_0 \ldots x_k$;

$f_j(\bar{x})$ is the measurement contribution function $f_j(x_0 \ldots x_k)$ for any $\bar{x}=x_0 \ldots x_k \in \Omega_k$; and $I_j$ is the intensity/color value of the $j^{th}$ pixel (herein the term "intensity" is used to refer to the color value of the pixel, defined in any color space, color model, and/or bit depth).

Bidirectional path tracing evaluates the integrals from equation (4) using a Monte Carlo sampling technique which assembles together individual paths by connecting two independent sub-paths: (i) a light sub-path which starts at a light source and is generated through standing light tracing, and (ii) a eye sub-path which starts at the lens and is generated through standard particle tracing.

In the conventional approach discussed in the aforementioned 1997 Veach reference, bidirectional path tracing samples a single light sub-path and a single eye sub-path at a time, and combines the two using the formula:

$$F_j(\bar{x}) = \sum_{s,t} w_{s,t}(\bar{x}_{s,t}) \frac{f_j(x_{s,t})}{p(\bar{x}_{s,t})} \quad (5)$$

where:

$\bar{x}_{s,t} = y_0 \ldots y_s z_t \ldots z_0$;

$f_j(\bar{x}_{s,t})$ is the measurement contribution function for sampling technique (s,t) used to generated paths with s+1 light sub-paths and t+1 eye sub-paths, respectively.

$p(\bar{x}_{s,t}) = p_{s,t}(\bar{x}) = p_L(y_0 \ldots y_s)p_E(z_t \ldots z_0)$ is the probability density function for the sampling technique (s,t) used to generated paths with s+1 light sub-paths and t+1 eye sub-paths, respectively;

$w_{s,t}(\bar{x}_{s,t})$ is the multiple importance sample weight for the sampling technique (s,t) referred to in the aforementioned 1997 Veach reference.

The integrals $I_j$ are approximated by a simple Monte Carlo sum over N sampled paths:

$$I_j \approx \frac{1}{N} \sum_{i=1}^{N} F_j(\bar{x}_i) \quad (6)$$

Exemplary, the estimation of all the measurements $I_j$ is performed in parallel using multiple populations of Markov Chains representing bidirectional paths sampled according to the equilibrium light transport distribution $f$ (function $f$ referring to the contribution function $f_j(\bar{x}_{s,t})$ above)

The primary sample space coordinates of paths generated through standard bidirectional path tracing, an exemplary technique of which is disclosed in "A Simple and Robust Mutation Strategy for the Metropolis Light Transport Algorithm," authors C. Kelemen et al., *Comp. Graphics Forum*, 21(3), 2002, the content of which is hereby incorporated by reference. In particular, a mapping is defined from vectors of random numbers $u=(u_1, u_2, \ldots)$ in the infinite dimensional unit hypercube H to the space of bidirectional paths through a transformation function $T: H \to Q$. In this context, the probability density of the path T(u) is given by the inverse of the determinant of the Jacobian of T:

$$p(T(u)) = \left| \frac{dT(u)}{du} \right|^{-1} \quad (7)$$

Exemplary, M bidirectional paths are generated by sampling (e.g., uniformly sampling) the unit hypercube H. The resulting paths $$X = \{\bar{x}_p = T(u_p)\}_{p=1}^{M}$$

are then used to estimate the total energy reaching the image:

$$E \approx \frac{1}{M} \sum_{p=1}^{M} F(u_p) \quad (8)$$

where F is the global contribution function:

$$F(u_p) = \sum_j F_j(u_p) \quad (9)$$

Further exemplary, a subset of N (<M) paths are resampled out of the family X with a distribution proportional to F, and sorted into different populations based on their subpath lengths (s, t), such that $P_{s,t}$ is the population of all paths formed connecting a light subpath of length s and an eye subpath of length t and $$N = \sum_{s,t} N_{s,t}$$

with $N_{s,t}=\text{card}(P_{s,t})$.

FIG. 1 illustrates an exemplary construct 100 in which eye and light subpaths operate to form bidirectional paths in accordance with the present invention. The construct 100 includes a light source 110, representing a first point A, and a sensor 120, representing a second point B (e.g., a pixel within the image to be rendered). The construct 100 further includes surfaces 132, 134, 136 and 138, from which the sub-paths reflect.

As illustrated, there are a total of three light sub-paths $y_0^1, y_1^1, y_2^1$ extending from point A 110, and three eye sub-paths $z_0^1, z_1^1, z_2^1,$ extending from point B. In general, each first sub-path $y_s^p$ is defined by a path index p and a length defined by terminating vertex s, and each second sub-path $z_t^q$ is defined by a path index q and a length defined by terminating vertex t. The term "sampling technique (s,t)" refers to the pseudo-random or quasi-random sampling process through which a plurality of paths are generated, each path including a light subpath of length s and an eye subpath of length t.

In a specific example, when a particular path between a light source and a view point (e.g., an eye/camera perspective) is selected to be a total of six vertices long, each of the following light and eye subpath combinations form a particular population:

| | |
|---|---|
| # of light subpath vertices = 0<br># of eye subpath vertices = 6 | Population $P_6(0,6)$ |
| # of light subpath vertices = 1<br># of eye subpath vertices = 5 | Population $P_6(1,5)$ |
| # of light subpath vertices = 2<br># of eye subpath vertices = 4 | Population $P_6(2,4)$ |
| # of light subpath vertices = 3<br># of eye subpath vertices = 3 | Population $P_6(3,3)$ |
| # of light subpath vertices = 4<br># of eye subpath vertices = 2 | Population $P_6(4,2)$ |
| # of light subpath vertices = 5<br># of eye subpath vertices = 1 | Population $P_6(5,1)$ |
| # of light subpath vertices = 6<br># of eye subpath vertices = 0 | Population $P_6(6,0)$ |

Accordingly, population $P_6(0,6)$ includes a plurality of bi-directional paths, each of which is composed of a light subpath of zero vertices, and an eye subpath of six vertices. Population $P6(4,2)$ includes a plurality of bi-directional paths, each of which is composed of a light subpath of four vertices, and an eye subpath of two vertices.

The number of bi-directional paths within each population may be any arbitrary number, which may be the same number of which may be a different number between different populations. Exemplary, the number of bidirectional paths within a population may range from 1-1,000,000, and further specifically may range from 1-10,000. The total length of the bidirectional paths between the light source and a measurement point (a length of six vertices in the above illustrated embodiment) can be any arbitrary length, an exemplary range for which is between 1-1,000, and further exemplary, between 1-100, and more particularly, between 1-10.

Each population $P_{s,t} = \{u_i\}_{i=1}^{N_{s,t}}$ is evolved through a series of m Metropolis-Hastings steps. In each of the m steps, each the samples $u_i$ are updated according to the following Differential Evolution Metropolis-Hastings (DE-MH) mutation rule:

(i) generate a new candidate according to the equation:

$$u' = u_i + g(u_{k_1} - u_{k_2}) + e, \quad (10)$$

where
  $g \sim U(0, \gamma)$,
  $e \sim N(0, \beta)$, and
  $k_1, k_2$ are random indices, such that $k_1 \neq k_2 \neq i$, $k_1 \neq k_2$, (ii) compute a corresponding MH acceptance ratio:

$$a = \min\left(1, \frac{F(u')}{F(u)}\right) \quad (11)$$

(iii) accept the new candidate, setting $u_i = u'$, with probability a, reject it otherwise.

Exemplary, both the samples $T(u_i)$ and $T(u')$ to each measurement $I_j$ with weights proportional to their average acceptance probability:

$$I_j = I_j + (1-a) \times c \times h_j(u) \quad (12)$$

$$I_j = I_j + a \times c \times h_j(u') \quad (13)$$

$$c = \frac{E}{m \times N} \quad (14)$$

where the quantity $h_j(u)$ is predefined and represents an intensity of a filtering kernel associated to the measurement point j applied at the unevolved path u, and where the quantity $h_j(u')$ is predefined and represents an intensity of a filtering kernel associated to the measurement point j applied at the unevolved path u'

Referring to eq. (12), the first quantity on the right side of the equal sign $I_j$ represents the previously accumulated pixel intensity resulting from all the previous evolution steps.

The second quantity on the right side of the equal sign:

$$(1-a) \times c \times h_j(u)$$

represents the intensity contribution provided by the presently-selected unmodified bidirectional path, this contribution is added to the accumulated intensity $I_j$ of the pixel.

Referring to eq. (13), the first quantity on the right side of the equal sign $I_j$ represents previously accumulated pixel intensity resulting from all the previous evolution steps.

The second quantity on the right side of the equal sign:

$$a \times c \times h_j(u')$$

represents the intensity contribution provided by the modified/evolved bidirectional path; this contribution is added to the accumulated intensity $I_j$ In an exemplary embodiment, the control parameters $\gamma$ and $\beta$ may be set to 0.05 and 1/64 respectively. Further exemplary, m (the number of times operations (i)-(iii) are repeated) ranges from 100 to 1,000,000, e.g., 10,000.

The indices $k_1$ and $k_2$ can also be chosen with different strategies. One strategy is to select them with a uniform random distribution in the remainder of the population, whereas another one is to select them according to some non-uniform distribution which puts weight around the current sample i.

In one embodiment, a discretized Cauchy distribution of parameter 0.05 (relative to the population size) is used. This strategy essentially applies the DEMH rule in a more local manner, as if it was applied to a set of "soft sub-populations," as described in "Markov Chain Monte Carlo Sampling Using Direct Search Optimization," authors M. J. A Strens et al., *Proceedings of the Nineteenth International Conference on Machine Learning*, Sydney Australia, 2002, herein incorporated by reference.

An exemplary pseudocode embodiment for the DE-MH mutation described above is as follows:

```
for each chain i=ϵ{1, ... N}
  do j=UniformRandom(1,N)while j equals i
  do k=UniformRandom(1,N)while k equals i or j
  //Construct a tentative chain x'_i
  for each parameter p=ϵ{1,‖x_i‖}
    x'_{i,p}=x_{i,p}+γ(x_{j,p}−x_{k,p})+NormalRandom(0,σ)
  //Metropolis-Hastings acceptance probability
  if UniformRandom(0,1)<
```

$$\frac{f(x'_i)}{f(x_i)}$$

$x_i = x'_i$ where UniformRandom(a,b) returns a uniformly distributed random number in the range [a,b], NormalRandom($\mu,\sigma$) returns a random number from the normal distribution of N($\mu,\sigma$), i is the index of the current chain (i.e., the path formed by the current combined eye and light subpaths), j and k are uniformly distributed random indices in $\{1, \ldots N\}$ such that $i \neq j$, k and $j \neq k$, and $\gamma$ is a constant in the interval (0,1].

The above-described Differential Evolution Metropolis Light Transport (DE-MLT) method begins with a set of seed Monte Carlo samples taken from a stratified forward or bidirectional path tracer. In one embodiment, the method includes a re-sampling step to create a new set of samples, where the original seed paths appear with frequencies proportional to their final contribution to the image.

Accordingly, in contrast to some prior art methods in which a single bidirectional path is ascertained and an intensity measurement obtained for each, the method of the present invention utilizes a population of bidirectional paths having the same number of light subpath vertices and the same number of eye subpath vertices. The method uses a plurality of collected samples to form a set of short Markov chains, and treats all of the chains as a single population, evolving all of the chains in parallel using the Differential Evolution-Monte Carlo approach, described above. In so doing, faster convergence of the light transport simulation is achieved, as well as more robust treatment of local maxima, and simplicity of the algorithm.

Figure 2:
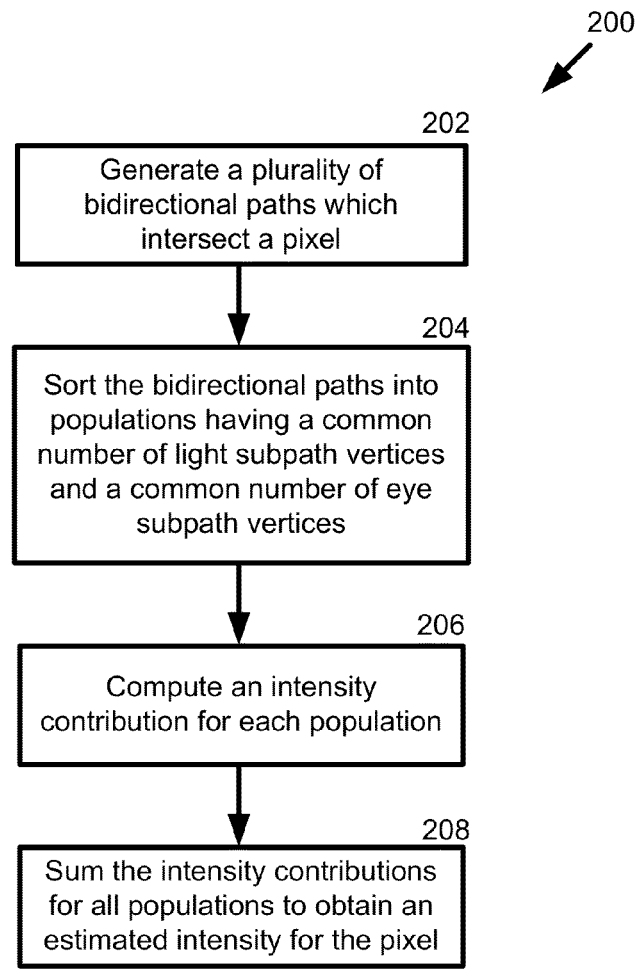
FIG. 2 illustrates an exemplary method for estimating the intensity of a pixel in accordance with the present invention.

FIG. 2 illustrates a method for estimating the intensity of a pixel in accordance with one embodiment of the present invention. At 202, a plurality of bidirectional paths extending between a light source and a measurement point is generated, the measurement point representing a pixel within the image which is to be rendered. Each bidirectional path includes a light subpath portion extending from the light source and an eye subpath portion extending from the view point and coupled to the light subpath. Each light subpath is characterized by a number of vertices included within said light subpath, and similarly, each eye subpath is characterized by a number of vertices included within said eye subpath.

Exemplary of operation 202, a mapping is defined from vectors of random numbers $u=(u_1, u_2, \ldots)$ in the infinite dimensional unit hypercube H to the space of bidirectional paths through a transformation function $T:H \to \Omega$. In this context, the probability density of the path $T(u)$ is given by the inverse of the determinant of the Jacobian of T as described above in eq. (7). Subsequently, a plurality of bi-directional paths are generated by sampling (e.g., uniformly sampling) the unit hypercube H. Further exemplary of operation 202, a second pass of the bi-directional paths is performed, whereby a subset of the bi-directional paths is resampled out of the original set with a distribution proportional to a global distribution function, an embodiment of which is described in eqs. (8) and (9).

At 204, the plurality of bidirectional paths are separated into different populations, whereby each population includes bidirectional paths constructed from eye subpaths having a common number of vertices, and light subpaths having a common number of vertices. Exemplary of this operation, different populations are sorted based on their light and eye subpath lengths (s, t), such that $P_{s,t}$ is the population of all paths formed connecting a light subpath of length s and an eye subpath of length t and $$N = \sum_{s,t} N_{s,t}$$

with $N_{s,t} = \text{card}(P_{s,t})$, as described above.

At 206, an intensity contribution is computed for each of the individual populations, and at 208, the intensity contributions are summed over all populations to estimate the intensity of the pixel. Exemplary embodiments of these processes are described below.

Figure 3:
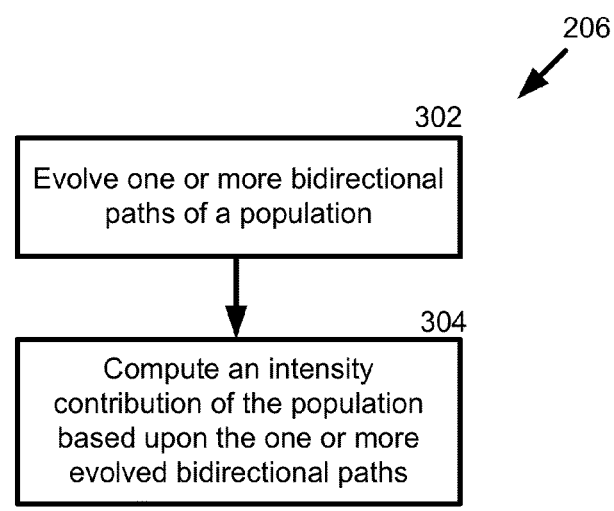
FIG. 3 illustrates an exemplary method for computing an intensity contribution for a population formed in accordance with the method of FIG. 2.

FIG. 3 illustrates an exemplary embodiment of operation 206, in which an intensity contribution is computed for an individual population. At 302, one or more bidirectional paths of a population are evolved to generate a respective one or more bidirectional paths. Evolution of the one or more bidirectional paths may be performed using any evolution technique, exemplary embodiments of which include a Metropolis-Hastings evolution or a Differential Evolution Metropolis-Hastings technique, described above. In a specific embodiment, the evolutionary processes described above in equations (i)-(iii) are performed on each of the bi-directional paths within a population. The bidirectional paths included within the population may all be evolved, or one or more of the paths may remain unevolved. For example, the evolved bidirectional paths may be rejected according to their acceptance probability, as described above.

At 304, an intensity contribution for the population is computed based upon the one or more evolved bidirectional paths included within the population. Exemplary embodiments of this operation are described below.

Figure 4:
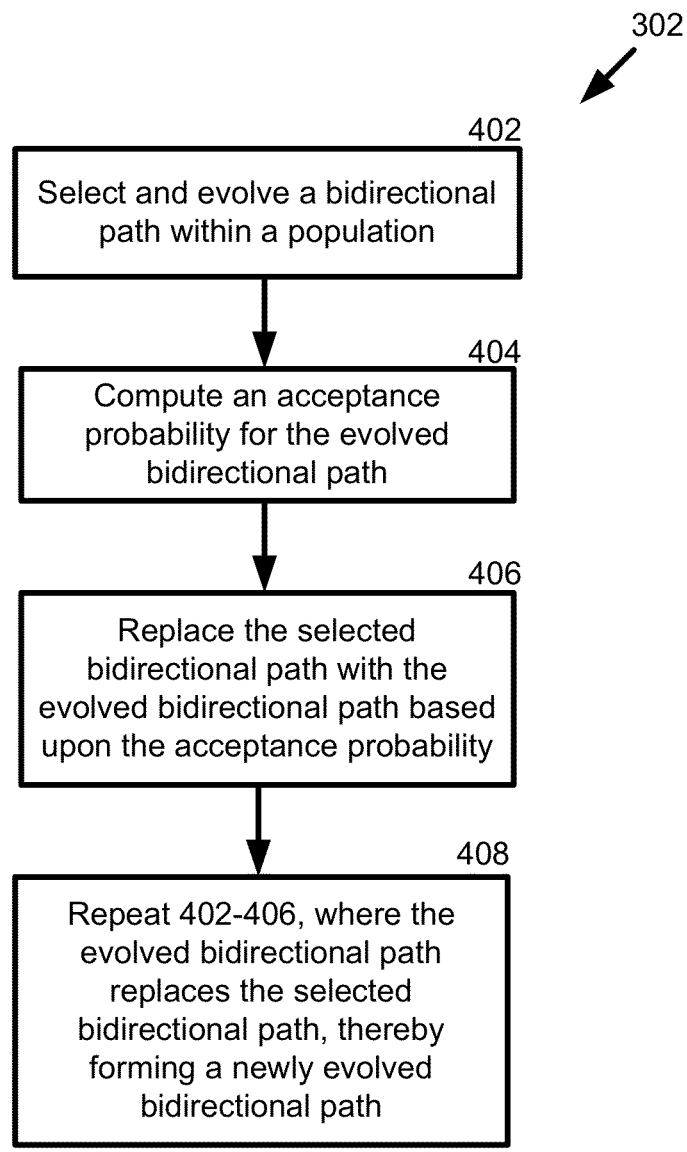
FIG. 4 illustrates an exemplary method for evolving a bi-directional path in accordance with the method of FIG. 2.

FIG. 4 illustrates an exemplary embodiment of operation 302, in which one or more bidirectional paths are evolved. At 402, a bidirectional path within a population is selected and evolved. At 404, an acceptance probability for the evolved bi-directional path is computed. At 406, the selected bidirectional path is replaced with the evolved bidirectional path based upon the computed acceptance probability. At 408, the process returns to operation 402, where the evolved bidirectional path operates as the selected bidirectional path, and the execution of operation 402 results in a further evolved bidirectional path.

Exemplary of operation 402, the selected bi-directional path is evolved according to the equation (as shown in eq. (10) above):

$$u' = u_i g(u_{k_1} - u_{k_2}) + e,$$

wherein:
  $u_i$ is the selected bidirectional path,
  $u'$ is the evolved bidirectional path,
  g and e are predefined parameters, and
  $k_1, k_2$ are random indices, such that $k_1 \neq i$, $k_2 \neq i$, $k_1 \neq k_2$.

Each population $P_{s,t} = \{u_i\}_{i=1}^{N_{s,t}}$ is evolved through a series of m Metropolis-Hastings steps. In each of the m steps, each the samples $u_i$ are updated according to the following Differential Evolution Metropolis-Hastings (DE-MH) mutation rule:

Exemplary of operation 404, the acceptance probability is computed for the evolved bidirectional path according to the equation:

$$a = \min\left(1, \frac{F(u')}{F(u)}\right),$$

wherein:
  a is the acceptance ratio of the evolved bidirectional path, and
  the quantity $$\frac{F(u')}{F(u)}$$

is predefined and represents an intensity ratio corresponding to the intensity contribution of a single evolved bidirectional path versus a selected unevolved bidirectional path. Exemplary, the quantity $F(u')$ is a global contribution function for an evolved bidirectional path intersecting with pixel j, and quantity F(u) is a global contribution function for an unevolved bidirectional path intersecting with pixel j.

Exemplary of operation 406, the acceptance probability computed in operation 404 is compared to a random number selected within an interval of (0, 1], and subsequently replacing the bidirectional path selected at 402 (which may be an unevolved bidirectional path or may have been previously evolved in an earlier iteration of operations 402-408) if the computed acceptance probability is greater than the selected random number. Further exemplary, if the computed acceptance probability is less than the selected random number, the evolved version of the bi-directional path is rejected, and the operations 402-408 are repeated for the previously-selected bi-directional path, although operation 402 results in an evolved bidirectional path which differs from the previously-evolved bidirectional path.

Referring again to FIG. 3, operation 304, in which the intensity contribution for a particular path in a population is computed, may be performed according to the equation:

$$I_j^{new,evolved} = I_j^{old,evolved} + a_y \times c \times h_j(u')$$

wherein
$I_j^{new,evolved}$ represents an updated accumulated intensity contribution of the evolved bidirectional paths of the population for pixel j,
$I_j^{old,evolved}$ represents a previously accumulated intensity contribution of the evolved bidirectional paths of the population for pixel j, and
the quantity:

$$a_y \times c \times h_j(u')$$

represents the intensity contribution provided by an evolved version of bidirectional path y, wherein:
$a_y$ is the acceptance ratio of said evolved bidirectional path y,
c is a predefined value, and
the quantity $h_j(u')$ is predefined and represents the intensity of a filtering kernel associated to the measurement point j applied at the evolved path u'.

Further exemplary of operation 304, an accumulated intensity contribution is similarly computed for the unevolved bidirectional paths (notwithstanding the acceptance or rejection of the evolved bidirectional paths), the intensity contributions of these unevolved bidirectional paths computed according to the equation:

$$I_j^{new,unevolved} = I_j^{old,unevolved} + (1-a_y) \times c \times h_j(u_i)$$

wherein
$I_j^{new,unevolved}$ represents an updated accumulated intensity contribution of the unevolved bidirectional paths of the population for pixel j,
$I_j^{old,unevolved}$ represents a previously accumulated intensity contribution of the unevolved bidirectional paths of the population for pixel j, and
the quantity:

$$(1-a_y) \times c \times h_j(u_i)$$

represents the intensity contribution of an unevolved bidirectional path y for pixel j, wherein:
$a_y$ is the acceptance ratio of the evolved bidirectional path y,
c is a predefined value, and
the quantity $h_j(u_i)$ is predefined and represents an intensity of a filtering kernel associated to the measurement point j applied at the unevolved path $u_i$.

Referring again to FIG. 2, operation 206, in which an intensity contribution is computed for each of the individual populations, may be performed according to the equation:

$$I_j^{new,total} = I_j^{new,evolved} + I_j^{new,unevolved}$$

wherein:
$I_j^{new,evolved}$ is the collective intensity contribution of the evolved bidirectional paths;
$I_j^{new,unevolved}$ is the collective intensity contribution of the unevolved bidirectional paths; and
$I_j^{new,total}$ is the collective intensity contribution for the population of the evolved and unevolved bidirectional paths.

Further exemplary, operation 208 in which the intensity of a pixel is estimated, is computed according to the equation:

$$I_j^{est} = \sum_N I_j^{new,total}$$

wherein:
$I_j^{new,total}$ is the collective intensity contribution for one population of bidirectional paths;
N is the total number of populations of bidirectional paths formed in operation 204; and
$I_j^{est}$ is the estimated intensity of the pixel.

The methods illustrated in FIGS. 2-4 may be performed in a variety of applications. In one exemplary embodiment, the method is performed in conjunction with a pixel rendering method, for example, as a part of a fragment shading process in which ray tracing techniques are used to compute intensity/color values for pixels. The method of FIGS. 2-4 can be implemented in other applications, such as virtual measurements of the light transport between arbitrary points.

Figure 5:
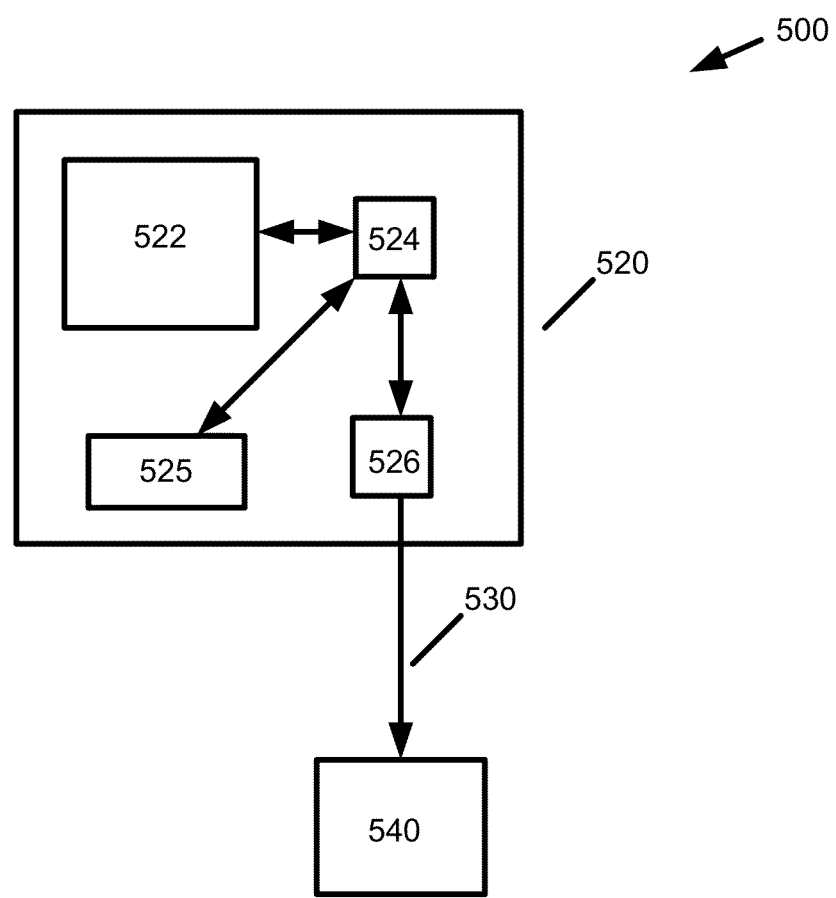
FIG. 5 illustrates an exemplary system in which the methods of FIGS. 2-4 finds utility in accordance with the present invention.

FIG. 5 illustrates an exemplary system 500 in which the methods of FIGS. 2-4 finds utility in accordance with the present invention. The system 500 includes a graphics processing sub-system 520 and an output device 540, such as a monitor or printer. The graphics processing sub-system 520 includes a processor 522, a memory interface 524, a frame buffer 525, and a scanout processor 526. The processor 522 is operable to perform any or all of the operations illustrated in FIGS. 2-4 herein, and is a parallel processing architecture in an exemplary embodiment. A frame buffer 526 is operably coupled to the processor 522 for receiving rasterized and raytraced fragment values for each frame, and for reading out a composite image of each frame to the output device 540 via memory interface 524 and link 530 (e.g., a DVI link). In a specific embodiment, the processor 522 is operable to carry out one, several, or all of the operations described in any one, several or more of FIGS. 2-4. Further, the processor 522 may store instruction code for performing the methods of FIGS. 2-4. In an alternative embodiment, system 500 may take on different forms, and processor 520 may be an embedded in such different systems. Further alternatively, the processor 522 may take the form of an application specific integrated circuit or other hardware/firmware circuit operable to carry out the operations illustrated in any one, several, or all of FIGS. 2-4.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory (which may be included locally within the processor 520 or globally within system 500) is operable to store instructions for performing any of the operations illustrated in FIGS. 2-4. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for estimating the intensity of a pixel included within an image, the method comprising:
   (i) generating a plurality of bidirectional paths extending between a light source and a set of measurement points, each bidirectional path comprising a light subpath extending from the light source and an eye subpath extending from the view point and coupled to the light subpath,
      wherein each light subpath is characterized by a number of vertices included within said light subpath, and
      wherein each eye subpath is characterized by a number of vertices included within said eye subpath;
   (ii) sorting the plurality of bidirectional paths into separation populations, wherein each population includes bidirectional paths constructed from eye subpaths having a common number of vertices, and light subpaths having a common number of vertices;
   (iii) computing an intensity contribution of each population, and
   (iv) summing the intensity contributions over a plurality of populations to estimate the intensity of the pixel.

2. The method of claim 1, wherein (ii) further comprises resampling a subset of the plurality of generated bidirectional paths with a distribution proportional to a global contribution function of the image.

3. The method of claim 1, wherein (iii) comprises:
   evolving one or more bidirectional paths of a population to generate a respective one or more evolved bidirectional paths; and
   computing an intensity contribution for said population based upon the one or more evolved bidirectional paths included therein.

4. The method of claim 3, wherein evolving the bidirectional paths comprises evolving the bidirectional paths through a plurality of Differential Evolution Metropolis-Hasting steps.

5. The method of claim 3, wherein evolving the bidirectional paths comprises:
   for each bidirectional subpath within the population,
   (a) evolving a selected bidirectional path;
   (b) computing an acceptance probability for the evolved bidirectional path; and
   (c) replacing the selected bidirectional path with the evolved bidirectional path based upon the computed acceptance probability; and
   (d) repeating (a)-(c), wherein the evolved bidirectional path operates as the selected bidirectional path, and a new bidirectional path is evolved therefrom in (a).

6. The method of claim 5, wherein (a) comprises evolving a selected bidirectional path according to the equation:

$$u' = u_i + g(u_{k_1} - u_{k_2}) + e,$$

wherein:
   $u_i$ is the selected bidirectional path,
   $u'$ is the evolved bidirectional path,
   $g$ and $e$ are predefined parameters, and
   $k_1, k_2$ are random indices, such that $k_1 \neq i$, $k_2 \neq i$, $k_1 \neq k_2$.

7. The method of claim 5, wherein (b) comprises computing an acceptance ratio of the evolved bidirectional path according to the equation:

$$a = \min\left(1, \frac{F(u')}{F(u)}\right),$$

wherein:
   $a$ is the acceptance ratio of the candidate bidirectional path, and
   the quantity $$\frac{F(u')}{F(u)}$$

is predefined and represents an intensity ratio corresponding to the intensity contribution of an evolved bidirectional path $u'$ versus a selected bidirectional path $u$.

8. The method of claim 5, wherein (c) comprises:
   comparing the acceptance probability to a random number occurring within an interval of [0, 1];
   determining that the acceptance probability is greater than the random number; and
   replacing the selected bidirectional path with the evolved bidirectional path.

9. The method of claim 3, wherein computing an intensity contribution for the population comprises computing an intensity contribution of one or more evolved bidirectional paths included within the population according to the equation:

$$I_j^{new,evolved} = I_j^{old,evolved} + a_y \times c \times h_j(u')$$

wherein $I_j^{new,evolved}$ represents an updated accumulated intensity contribution of the evolved bidirectional paths of the population, $I_j^{old,evolved}$ represents a previously accumulated intensity contribution of the evolved bidirectional paths of the population, and the quantity:

$$a_y \times c \times h_j(u')$$

represents the intensity contribution provided by an evolved bidirectional path, wherein:
  $a_y$ is the acceptance ratio of said evolved bidirectional path,
  c is a predefined value, and
  the quantity $h_j(u')$ is predefined) and represents the intensity of a filtering kernel associated to the measurement point j applied at the evolved path u'.

10. The method of claim 3,
wherein said population further includes one or more bidirectional paths which remain unevolved,
wherein computing an intensity contribution for the population further comprises computing an intensity contribution for the respective one or more unevolved bidirectional paths according to the equation:

$$I_j^{new,unevolved} = I_j^{old,unevolved} + (1-a_y) \times c \times h_j(u_i)$$

wherein $I_j^{new,unevolved}$ represents an updated accumulated intensity contribution of the unevolved bidirectional paths of the population, $I_j^{old,unevolved}$ represents a previously accumulated intensity contribution of the unevolved bidirectional paths of the population, and the quantity:

$$(1-a_y) \times c \times h_j(u_i)$$

represents the intensity contribution of an unevolved bidirectional path, wherein:
  $a_y$ is the acceptance ratio of said unevolved bidirectional path,
  c is a predefined value, and
  the quantity $h_j(u_i)$ is predefined and represents an intensity of a filtering kernel associated to the measurement point j applied at the unevolved path $u_i$.

11. The method of claim 10, wherein computing an intensity contribution for the population comprises computing a sum of the updated intensity contribution for the one or more evolved bidirectional paths and the updated intensity contribution for the one of more unevolved bidirectional paths, said sum provided according to the equation:

$$I_j^{new,evolved} + I_j^{new,unevolved} = I_j^{new,total}$$

wherein:

$I_j^{new,evolved}$ is the collective intensity contribution of the evolved bidirectional paths;

$I_j^{new,unevolved}$ is the collective intensity contribution of the unevolved bidirectional paths; and $I_j^{new,total}$ is the collective intensity contribution of the population of the evolved and unevolved bidirectional paths.

12. The method of claim 1, wherein (vi) comprises computing a collective intensity estimate for the pixel according to the equation:

$$I_j^{est} = \sum_N I_j^{new,total}$$

wherein:

$I_j^{new,total}$ is the collective intensity contribution for one population of bidirectional paths;

N is the total number of populations of bidirectional paths formed in (ii); and $I_j^{est}$ is the estimated intensity of the pixel.

13. A system operable for estimating the intensity of a pixel included within an image, the system including a processor operable for:
  (i) generating a plurality of bidirectional paths extending between a light source and a set of measurement points, each bidirectional path comprising a light subpath extending from the light source and an eye subpath extending from the view point and coupled to the light subpath,
    wherein each light subpath is characterized by a number of vertices included within said light subpath, and
    wherein each eye subpath is characterized by a number of vertices included within said eye subpath;
  (ii) sorting the plurality of bidirectional paths into separation populations, wherein each population includes bidirectional paths constructed from eye subpaths having a common number of vertices, and light subpaths having a common number of vertices;
  (iii) computing an intensity contribution of each population, and
  (iv) summing the intensity contributions over a plurality of populations to estimate the intensity of the pixel.

14. The system of claim 13, wherein the processor's operation (ii) further comprises resampling a subset of the plurality of generated bidirectional paths with a distribution proportional to a global contribution function of the image.

15. The system of claim 13, wherein the processor's operation (iii) further comprises:
  evolving one or more bidirectional paths of a population to generate a respective one or more evolved bidirectional paths; and
  computing an intensity contribution for said population based upon the one or more evolved bidirectional paths included therein.

16. The method of claim 15, wherein the processor's operation of evolving the bidirectional paths comprises:
  for each bidirectional subpath within the population,
  (a) evolving a selected bidirectional path;
  (b) computing an acceptance probability for the evolved bidirectional path; and
  (c) replacing the selected bidirectional path with the evolved bidirectional path based upon the computed acceptance probability; and
  (d) repeating (a)-(c), wherein the evolved bidirectional path operates as the selected bidirectional path, and a new bidirectional path is evolved therefrom in (a).

17. A computer program product, resident on a non-transitory computer readable medium, storing instruction code for estimating the intensity of a pixel included within an image, the computer program product comprising:
  (i) instruction code for generating a plurality of bidirectional paths extending between a light source and a set of measurement points, each bidirectional path comprising a light subpath extending from the light source and an eye subpath extending from the view point and coupled to the light subpath,
  wherein each light subpath is characterized by a number of vertices included within said light subpath, and
  wherein each eye subpath is characterized by a number of vertices included within said eye subpath;
(ii) instruction code for sorting the plurality of bidirectional paths into separation populations, wherein each population includes bidirectional paths constructed from eye subpaths having a common number of vertices, and light subpaths having a common number of vertices;
(iii) instruction code for computing an intensity contribution of each population, and
(iv) instruction code for summing the intensity contributions over a plurality of populations to estimate the intensity of the pixel.

18. The computer program product of claim 17, wherein the instruction code (ii) further comprises instruction code for resampling a subset of the plurality of generated bidirectional paths with a distribution proportional to a global contribution function of the image.

19. The computer program product of claim 17, wherein the instruction code (iii) further comprises:
  instruction code for evolving one or more bidirectional paths of a population to generate a respective one or more evolved bidirectional paths; and
  instruction code for computing an intensity contribution for said population based upon the one or more evolved bidirectional paths included therein.

20. The computer program product of claim 19, wherein the instruction code for evolving the bidirectional paths comprises:
  for each bidirectional subpath within the population,
  (a) instruction code for evolving a selected bidirectional path;
  (b) instruction code for computing an acceptance probability for the evolved bidirectional path; and
  (c) instruction code for replacing the selected bidirectional path with the evolved bidirectional path based upon the computed acceptance probability; and
  (d) instruction code for repeating (a)-(c), wherein the evolved bidirectional path operates as the selected bidirectional path, and a new bidirectional path is evolved therefrom in (a).

* * * * *